Jan. 25, 1949.   F. T. ROWLAND   2,460,106
SPRING SUSPENSION FOR VEHICLES
Filed May 4, 1944   3 Sheets-Sheet 1
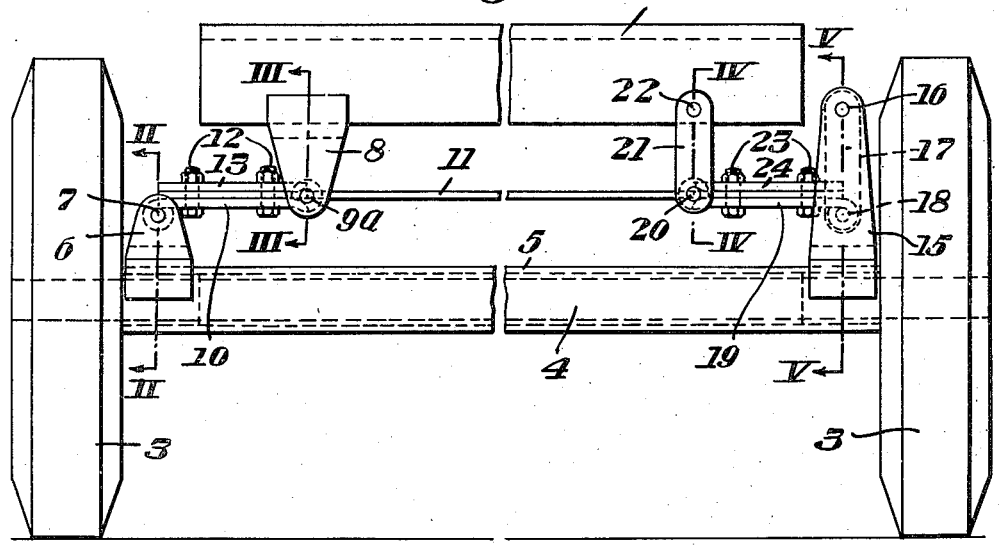
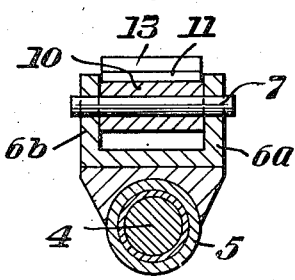
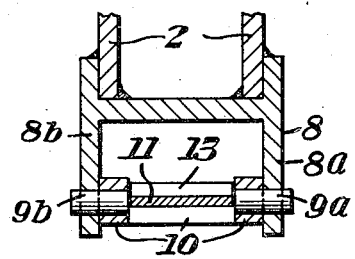
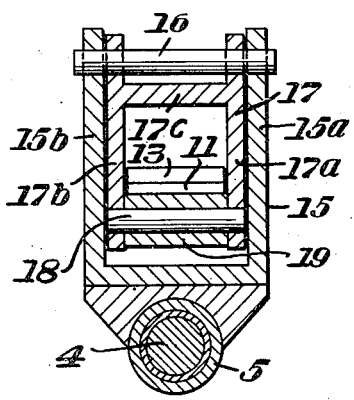
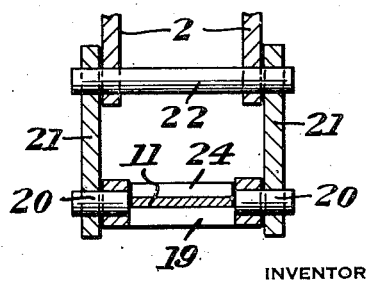
INVENTOR
Frederick T. Rowland

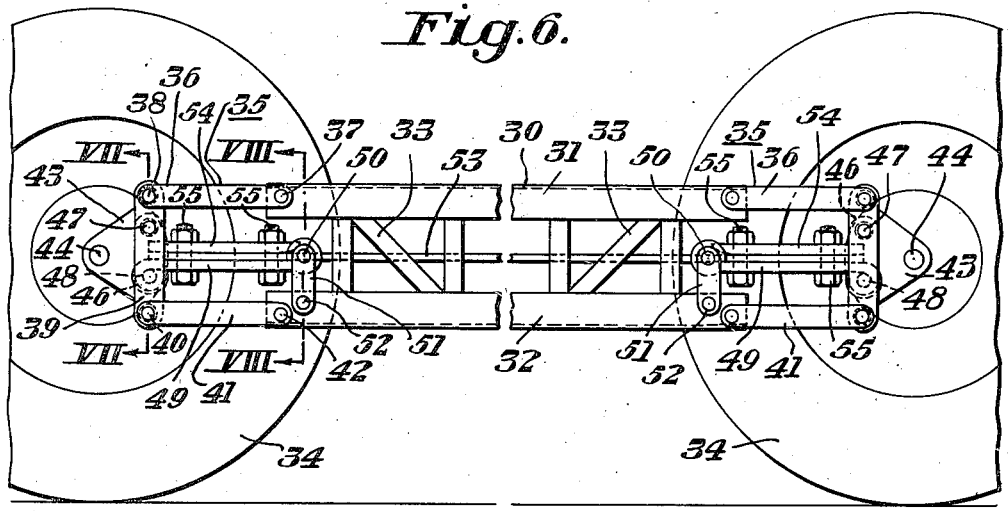
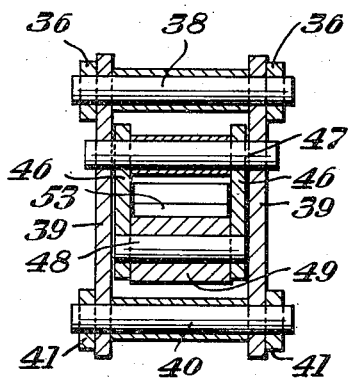
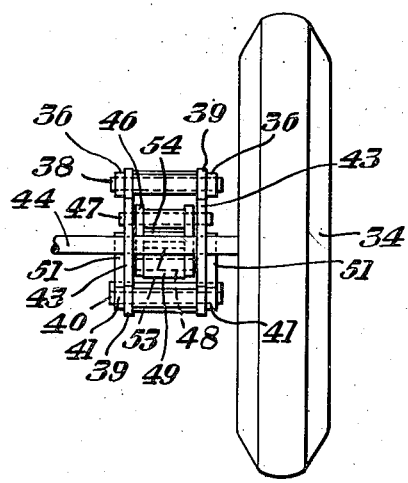
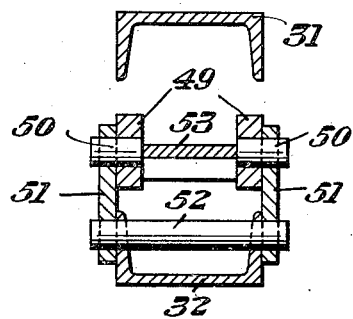

Jan. 25, 1949.　　　　F. T. ROWLAND　　　　2,460,106
SPRING SUSPENSION FOR VEHICLES
Filed May 4, 1944　　　　　　　　　　　　　　3 Sheets-Sheet 3
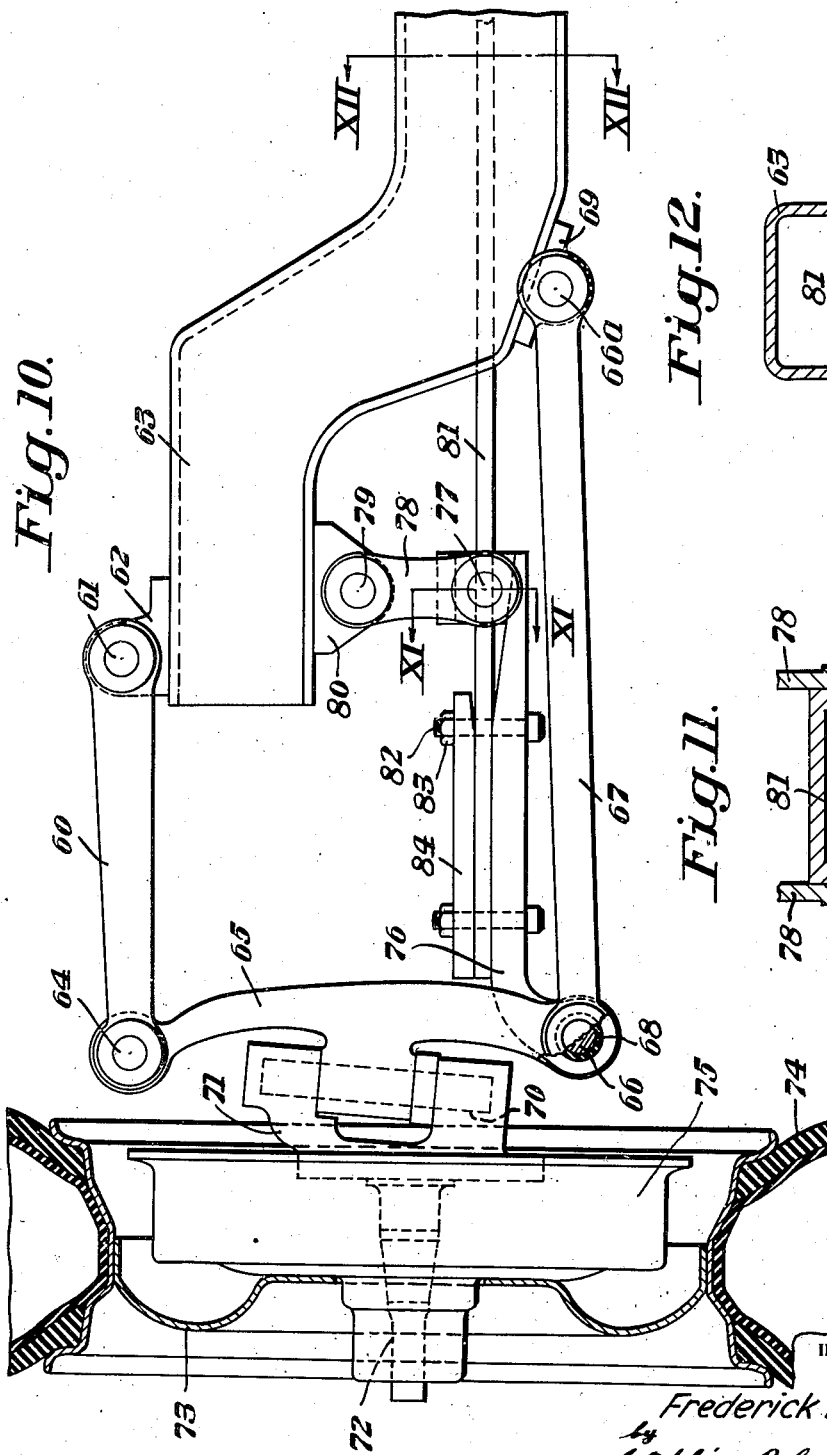
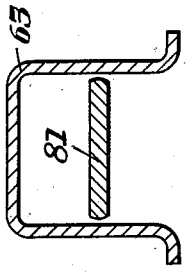
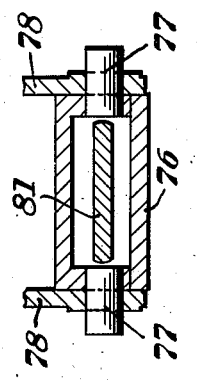
INVENTOR
Frederick T. Rowland Patented Jan. 25, 1949

2,460,106

UNITED STATES PATENT OFFICE 2,460,106

SPRING SUSPENSION FOR VEHICLES

Frederick T. Rowland, Grosse Pointe, Mich., assignor to Standard Steel Spring Company, Coraopolis, Pa., a corporation of Pennsylvania Application May 4, 1944, Serial No. 534,025

3 Claims. (Cl. 267—19)

1

This invention relates to a spring suspension for vehicles and more particularly to a single-plate spring suspension which eliminates the necessity of employing multi-leaf springs with their attendant disadvantages. The usual spring suspension for vehicles employs variable length multi-leaf springs in which the spring is mounted at its center and the load is applied to the ends of the spring. In accordance with the present invention I employ a single-plate spring which is supported adjacent its ends and the load is applied to the spring intermediate its ends, the portion of the spring between the points of application of the load being unsupported. By my invention the stress throughout the length of the single-plate spring is substantially constant, thereby increasing the life of the spring. By the use of a single-plate spring, as contrasted with a multi-leaf spring, the following advantages are obtained:

1. All inter-leaf friction, which is the cause of squeaks in multi-leaf springs, is eliminated.
2. The greasing of the leaves is eliminated.
3. The construction of the spring suspension is greatly simplified and its cost in reduced.
4. Spring covers and incidental appurtenances, such as clips and bolts, are eliminated.
5. The single-plate spring is under substantially uniform stress under all conditions of loading, thereby greatly increasing its life.

In the accompanying drawings which illustrate certain preferred embodiments of the invention, Figures 1 through 5 illustrate the invention as applied to the rear end of a vehicle.

Figure 1 is a rear elevation of the vehicle showing the spring suspension;

Figures 2, 3, 4 and 5 are sections, on an enlarged scale, taken respectively on the lines II. III, IV and V of Figure 1;

Figures 6 through 8 illustrate the invention as applied to tandem wheels of a vehicle;

Figure 6 is a side elevation of a portion of a vehicle showing the spring suspension;

Figures 7 and 8 are sections, on an enlarged scale, taken on the lines VII—VII and VIII—VIII, respectively, of Figure 6;

Figure 9 is a rear elevation of a part of the vehicle showing one of the rear wheels and the spring suspension;

Figures 10 through 12 illustrate the invention as applied to the front wheels of a vehicle having an independent suspension for each wheel;

Figure 10 is a front elevation of a portion of the vehicle illustrating thte spring suspension; and

2

Figures 11 and 12 are sections taken on the line XI—XI and XII—XII of Figure 10.

Referring now more particularly to the accompanying drawings, and for the present to Figures 1 through 5 wherein the spring suspension is applied to the rear of the vehicle, a frame cross member is designated by the reference numeral 2 and the road wheels by the reference numeral 3. The wheels are connected by an axle 4 mounted in an axle housing 5. A bracket 6 is rigidly mounted on the left-hand end of the axle. As shown more particularly in Figure 2, this bracket has two upstanding arms 6a and 6b in which a pin 7 is mounted. A bracket 8 is rigidly secured to the frame member 2, this bracket having two downwardly extending arms 8a and 8b in which two pins 9a and 9b are mounted. A bending arm 10 is pivoted at its inner end on the pins 9a and 9b and at its outer end on the pin 7. A single-plate spring 11 extends across the vehicle between the road wheels. The left-hand end of the single-plate spring 11 is secured by bolts 12 and a backing plate 13 to the bending arm 10.

A bracket 15 is rigidly secured to the right-hand end of the axle housing. As shown more particularly in Figure 5, this housing has two upstanding arms 15a and 15b in which a pin 16 is mounted. A link 17, which is box-like in cross section, is located within the arms 15a and 15b of the bracket 15. The link 17 comprises side members 17a and 17b connected by a cross member 17c. The upper ends of the side members 17a and 17b are pivoted on the pin 16. A pin 18 is mounted in the arms 17a and 17b adjacent their lower ends. A bending arm 19 is pivoted at its right-hand end on the pin 18 and at its left-hand end on two pins 20 which are carried by links 21. The upper ends of links 21 are pivoted on a pin 22 carried by the frame 2. The right-hand end of the single-plate spring 11 is secured to the bending arm 19 by bolts 23 and a backing plate 24.

The spring suspension operates in the following manner. Frame 2 carries the load of the vehicle and for symmetrical loading transmits one-half of the load through pin 22, links 21 to pins 20 on the right-hand side of the vehicle. On the left-hand side of the vehicle, one-half of the load is transmitted from the frame through bracket 8 to pins 9a and 9b. As the load is applied to the frame 2 deflecting the same, pins 20 and 9a and 9b move downwardly bending the single-plate spring 11, the right-hand end of which is clamped between the bending arm 19 and the backing plate 24, the left-hand end of which is clamped between bending arm 10 and backing plate 13.

The spring-plate 11 has a predetermined camber forming a part of an arc. The camber changes in relation to the load applied due to the bending moment. The bending moment applying to each end of the spring is equal to the load carried by the pin at the inner end of the bending arm, which in this case is pins 9a and 9b on the left side and pin 20 on the right side, times the length of the moment arm, which in this case is the horizontal distance between pins 9 and 7 on the left side and pins 20 and 18 on the right side. The load is then transmitted by the spring and bending arm 19 to pin 18, to link 17, to pin 16, to bracket 15, to the right-hand end of the axle housing 5. On the left-hand side of the vehicle the load is transmitted from pins 9a and 9b through the left-hand end of the spring 11, and through the bending arm 10 to pin 7 directly to the bracket 6, and from this bracket to the left-hand end of the axle housing. The load is then transmitted from the axle to the wheels to the road.

As load is applied, pins 9a and 9b on the left-hand side of the vehicle rotate about pin 7, and pins 20 on the right-hand side of the vehicle move outwardly and downwardly until spring 11 is in the normal load position shown in Figure 1. As additional load is applied, pins 20 move downwardly and inwardly, i. e., toward the left-hand side of the vehicle. The elongation and shortening of the spring 11, due to changes in load and the movement of the pins 20 as just described due to this elongation and shortening of the spring, is accompanied by rotation of links 21 about pin 22 and rotation of links 17a and 17b about pin 16.

In this embodiment of the invention as well as in the other embodiments, it will be seen that the single-plate spring is supported adjacent its ends rather than adjacent its center, that the load is applied to the spring intermediate the points of support of the spring, and that the spring is unsupported between the link 21 and the bracket 8 or between other means employed for applying the load to the spring.

We refer now to Figures 6 through 8 which illustrate the invention as applied to tandem wheels. A vehicle frame member 30 composed of an upper channel-shaped member 31 and a lower channel-shaped member 32 connected by cross members 33 extends lengthwise of the vehicle between the road wheels 34. A linkage indicated generally by the reference numeral 35 connects each end of the frame member 30 to one of the road wheels. The two linkages are the same so that a description of one will suffice for both. Referring to the linkage at the left-hand side of the frame member 30, two links 36 are pivoted adjacent the right-hand end on a pin 37 supported by the upper vehicle frame member 31. The left-hand end of each of the links 36 is pivoted on a pin 38 supported by vertical links 39. The lower ends of links 39 are pivoted on a pin 40 to which the left-hand ends of links 41 also are pivoted. The right-hand end of each of links 41 is pivoted to a pin 42 supported by the frame member 32. Formed integrally with or rigidly secured to each of the vertical links 39 is a bracket 43 which is connected to the axle 44.

As shown more in detail in Figures 7 and 8, two links 46 are located inside of the vertical links 39. Each of the links 46 is pivoted adjacent its upper end on a pin 47 supported in the links 39. A pin 48 is supported by the links 46 adjacent the lower ends of the links. A bending arm 49 has its outer end pivoted on the pin 48. The inner end of the bending arm 49 is pivoted on two pins 50 each supported in the upper ends of a link 51. The lower ends of links 51 are pivoted on a pin 52 mounted in the lower frame member 32.

A single-plate spring 53 extends between axles 44. Each end of the spring plate 53 is secured to one of the bending arms 49 by a backing plate 54 and bolts 55.

The spring suspension operates in the following manner. The load carried by vehicle frame 30 is transmitted through pins 52, links 51 and pins 50, to bending arms 49, to the spring 53. The plate spring 53 has a predetermined camber, which camber is a part of an arc of a circle. The plate spring carries the load by resistance to bending, transmitting the load to pins 48 at both ends. The load is transmitted from pins 48 through links 46 to pins 47, and from pins 47 to links 39, and from links 39 through brackets 43 to the axle 44 and wheels 34.

As load is applied to the vehicle frame member 30 and from the frame member to the spring through pin 52, links 51, pin 50 and bending arm 49, pins 48 and 50 move downwardly and outwardly away from the center of the spring until the spring is in the flat position as shown. As additional loading is applied to the spring, pin 48 moves inwardly (toward the center of the spring) and upwardly and pin 50 moves inwardly and downwardly. This motion is compensated for by links 46 and 51. Provision for allowing lengthening or shortening of the spring as the load changes may be made by other mechanisms than that shown.

In the embodiment shown in Figure 6 the outer end of each of the bending arms 49 is pivoted to pin 48 carried by links 46, which pin is movable outwardly and inwardly upon changes in load.

We refer now to Figures 10 through 12 which disclose the invention as applied to the front wheels of a vehicle having independent wheel suspensions.

Figure 10 illustrates one-half of the spring suspension system, the other half being identical to that shown. A link 60 is pivoted at its right-hand end on a pin 61, mounted in a bracket 62 secured to the vehicle frame cross member 63. The left-hand end of the link 60 is pivoted on a pin 64 to which the upper end of a link 65 also is pivoted. The lower end of link 65 is pivoted on a pin 66 on which also is pivoted the left-hand end of a link 67. A rubber bushing 68 is interposed between the pin 66 and the bending arm 76 for a purpose to be described hereinafter. The right-hand end of link 67 is pivoted on a pin 66a, mounted in a bracket 69, secured to the frame cross member 63.

The link 65 is pivoted on a kingpin 70, mounted in a journal 71, carrying a spindle 72. A wheel 73 is supported on the spindle and a tire 74 is mounted on the wheel. The reference numeral 75 designates the brake drum. The arrangement thus far described in connection with this figure is one commonly employed on automobiles.

A bending arm 76 is pivoted at its left-hand end on the pin 66, and at its right-hand end is pivoted on two pins 77 mounted in two links 78. The upper ends of the links 78 are pivoted on pins 79 mounted in a bracket 80 secured to the cross member 63. The left-hand end of a single-plate spring 81 is secured to the bending arm 76 by bolts 82 and nuts 83.

The load on the cross member 63 is transmitted one-half (for symmetrical loading) through pin 79, links 78, pins 77 and bending arm 76 to pin 66. The single-plate spring 81, the ends of which are clamped between bending arm 76 and back-up plate 84, has a predetermined camber which resists bending, transmits the load through pin 66 to link 65. From link 65 the load is transmitted to the kingpin 70, journal 71, spindle 72 and wheel 73 to the road. As load is applied to the spring 81 its camber is changed, the distance between the pins 66 on the left-hand and right-hand end of the vehicle increasing until the spring is in the horizontal position shown, and thereafter decreasing. This elongation or shortening of the spring plate 81 due to change in load is compensated for by any suitable means such, for example, as by providing the resilient bushing 68 between the pin 66 and the eye of the bending arm 76.

The invention is not limited to the preferred embodiments but may be otherwise embodied or practiced within the scope of the following claims.

I claim:
1. A spring suspension for vehicles, comprising a vehicle frame member, a linkage adjacent each end of the frame member connecting the frame member to a road wheel, two links each pivoted to the frame member adjacent one end of the frame member, two bending arms each having its outer end pivotally supported by one of the linkages and its inner end pivoted to one of said links, and a single-plate spring operatively connected adjacent its ends to said bending arms but unsupported between said bending arms.

2. A spring suspension for vehicles, comprising a vehicle frame member, a linkage adjacent each end of the frame member connecting the frame member to a road wheel, two links each pivoted to the frame member adjacent one end of the frame member, two bending arms each having its outer end pivotally supported by one of the linkages and its inner end pivoted to one of said links, and a single-plate spring operatively connected adjacent its ends to said bending arms but unsupported between said bending arms, the pivotal support of the outer end of at least one of the bending arms allowing relative movement of the outer end of the bending arm with respect to the linkage to provide for elongation and shortening of the spring as the load changes.

3. A spring suspension for vehicles, comprising a vehicle frame member, a linkage adjacent each end of the frame member connecting the frame member to a road wheel, a bending arm adjacent each end of the frame member, the end of the bending arm nearest the road wheel being pivotally supported by the linkage connected to said road wheel, the end of said bending arm farthest from said road wheel being operatively connected to the vehicle frame member, and a single-plate spring operatively connected adjacent its ends to said bending arms but unsupported between said bending arms, whereby the vehicle load is applied to the spring between the points of support of the spring.

FREDERICK T. ROWLAND.

REFERENCES CITED

The following references are of record in the file of this patent:

UNITED STATES PATENTS

| Number | Name | Date |
| --- | --- | --- |
| 91,615 | Ellis | June 22, 1869 |
| 356,954 | Paterson | Feb. 1, 1887 |
| 473,881 | Johnson | Apr. 26, 1892 |
| 475,304 | Faske | May 24, 1892 |
| 1,130,157 | Elling | Mar. 2, 1915 |
| 1,383,723 | Jones | July 5, 1921 |
| 1,742,387 | Gatter | Jan. 9, 1930 |
| 2,236,868 | Cook | Apr. 1, 1941 |

FOREIGN PATENTS

| Number | Country | Date |
| --- | --- | --- |
| 329,480 | Germany | Nov. 26, 1920 |